United States Patent [19]

Covelli

[11] 3,860,599

[45] Jan. 14, 1975

[54] PREPARATION OF HYDROXYQUINOLINES
[75] Inventor: Fred M. Covelli, Murrysville, Pa.
[73] Assignee: Koppers Company, Inc., Pittsburgh, Pa.
[22] Filed: Dec. 14, 1972
[21] Appl. No.: 315,208

[52] U.S. Cl. ...... 260/289 R, 260/283 R, 260/288 R, 260/289 OX, 424/245
[51] Int. Cl. .............................. C07d 33/38
[58] Field of Search ...... 260/289 OX, 289 R, 288 R

[56] References Cited
UNITED STATES PATENTS
3,312,708   4/1967   Lind ................................. 260/289 R
3,459,755   8/1969   Mathison et al. ............... 260/289 R

OTHER PUBLICATIONS

Okamoto; Chem. Pharm. Bull. 15, 4/28/66, p. 168–172.
Lepetit; Merck Index 7th edition, p. 1412.
Kogan et al., Chemical Abstracts, Vol. 32, 1938, p. 7031.

*Primary Examiner*—Donald G. Daus
*Assistant Examiner*—Mary C. Vaughn
*Attorney, Agent, or Firm*—Herbert J. Zeh, Jr.; Oscar B. Brumback; Olin E. Williams

[57] ABSTRACT

A new process for preparing hydroxyquinolines from aminoquinolines via an aqueous acid hydrolysis of the aminoquinoline to the hydroxyquinoline.

10 Claims, No Drawings

PREPARATION OF HYDROXYQUINOLINES

BACKGROUND OF THE INVENTION

This invention relates to the preparation of hydroxyquinolines. More particularly, the invention relates to the preparation of hydroxyquinolines from aminoquinolines by an aqueous acid hydrolysis reaction.

The compound 8-hydroxyquinoline has considerable significance as a chemical intermediate. The copper chelate of 8-hydroxyquinoline is one of the most effective pesticides (fungicides, herbicides, insecticides and rodenticides) known. In addition, other hydroxyquinolines are of commercial interest. However, the major drawback to a more widespread use of hydroxyquinoline, particularly 8-hydroxyquinoline, is the cost. At present there is no cheap and efficient method for preparing these compounds.

Heretofore, the most commonly used method of preparing 8-hydroxyquinoline has been the fusion of quinoline-8-sulfonic acid with excess caustic. The fused product was then neutralized and recovered. The yield of 8-hydroxyquinoline from this process is lower than desired. In addition, the process is detailed and costly. For example, see Fischer, U.S. Pat. No. 270,045; Grier, et al., U.S. Pat. No. 2,489,530; and O'Brochta, U.S. Pat. Nos. 2,999,095 and 2,999,094.

It is, therefore, the object of this invention to provide a new, cheaper, and easier method for preparing hydroxyquinoline, particularly 8-hydroxyquinoline.

SUMMARY OF THE INVENTION

I have found a new and better route to the preparation of hydroxyquinolines. The new process is based upon the low pH acid hydrolysis of aminoquinoline to give hydroxyquinoline. The equation for the method of my invention may be represented by the following illustration for 8-hydroxyquinoline:

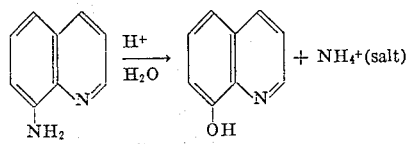

The process of my invention comprises reacting aminoquinoline with an acid to give hydroxyquinoline. The low pH acid hydrolysis is carried out in an aqueous medium at high temperatures and high pressures. The acid hydrolysis goes to essentially 100% completion and the hydroxyquinoline is recovered by any one of several techniques readily known in the art.

Any of the well known and commonly employed acids may be used for the hydrolysis reaction. Examples of some of the acids are hydrochloric acid, sulfuric acid, and phosphoric acid, etc. In addition to the mineral acids, aqueous bisulfate solutions may be employed. Examples of some useful bisulfates are ammonium bisulfate, sodium bisulfate, and potassium hydrogen sulfate.

The acids should be used in concentrations of at least 1.5 moles of acid per mole of aminoquinoline. However, I have found that a higher excess of acid is preferable. The molar ratio of acid to aminoquinoline should be from 1.5:1 to about 10:1. I have made hydroxyquinoline using molar ratios as low as 1.5:1 and as high as 10:1. The exact molar ratio used will depend on the particular acid used and the other parameters of the reaction. For example, when using a bisulfate, a larger excess will be beneficial. In addition, when low temperatures, pressures, and concentrations of aminoquinoline are used, a higher ratio of acid to aminoquinoline is desirable.

As mentioned above, the reaction is run in an aqueous medium. The concentration of aminoquinoline in the aqueous medium may be varied from about 2% to about 25%. I have found that concentrations in the range of from 5% to about 15% are preferred.

The process of my invention should be run at elevated temperatures and under super atmospheric pressure. The temperature should be from about 160° to about 220°C. Preferably, the temperature should be from 190°–210°C. The pressure should be from 75 to 325 psi, preferably 165 to 265 psi. The reaction time will usually take at least 2 or 3 hours even under the high temperatures and pressures. However, the reaction time will generally never exceed about 12 hours.

The hydroxyquinoline product can be isolated by any of several techniques. One common method is precipitation. The hydroxyquinoline products are only slightly soluble in water. Therefore, if the pH of the reaction mixture is adjusted to about 7.5, most of the hydroxyquinoline will precipitate out and can be recovered by filtration. Another common method that can be used alone or in conjunction with the precipitation process is solvent extraction. The hydroxyquinolines are generally soluble in many of the common organic solvents such as ether, nitrobenzene, and the like. The isolated product may then be further purified if necessary.

At the completion of the acid hydrolysis reaction, the aqueous medium contains the hydroxyquinoline, excess acid, and the by-product which is the ammonium salt of the acid. Therefore, the acid used for the reaction should be chosen with this fact in mind. For example, if precipitation is to be used for isolating the product, it is desirable that the neutralized salt of the acid used, be very soluble so that it will not precipitate out with the hydroxyquinoline product.

The aminoquinoline used as the starting material in my invention may be obtained in pure form or it may be obtained from quinoline via a nitration reaction followed by a reduction of the nitroquinoline to aminoquinoline. If the latter method is used, it is well known that the nitroquinoline will be a mixture of 5-nitroquinoline and 8-nitroquinoline. These compounds may be separated at this stage because of the differences of the melting points and other physical properties. Alternatively, the nitroquinolines may be reduced to 5-aminoquinoline and 8-aminoquinoline and then separated. For examples of these reactions see Feiser and Hershberg, Journal American Chemical Society, Vol. 62, page 1640–1645 (1940). The process of my invention will work for a mixture of 5-aminoquinoline and 8-aminoquinoline. In such case the 5-hydroxyquinoline and 8-hydroxyquinoline may be separated after they are formed.

The following examples are illustrative of some experiments demonstrating the effectiveness of my invention. The examples should be construed to illustrate the invention but should not be construed to limit the same.

EXAMPLE 1

A 2.4 liter rocking autoclave was fitted with a glass liner and charged with 25gms (0.174 moles) of 8-aminoquinoline, 59.7 gms (0.522 moles) of $H_3PO_4$, and 250 gms of $H_2O$. The solution was heated to 197°–209°C for 6 hours with rocking. The hydrolysis product was brought to a pH of 8 by addition of $NH_4OH$ and the 8-hydroxyquinoline precipitated out. Upon filtration and drying, a relatively pure product of 22.5 gms (90%) was obtained. IR analysis confirmed the product was 8-hydroxyquinoline. The aqueous mother liquor was not extracted for additional yield. The product was purified by dissolving in EtOH and charcoal treating. The charcoal was filtered out hot and the 8-hydroxyquinoline was precipitated by addition of water (mp 71°–73°C).

EXAMPLE 2

A 2.4 liter rocking autoclave was fitted with a glass liner and charged with 25 gms (0.174 moles) of 8-aminoquinoline, 34.8 gms (0.348 moles) $H_2SO_4$, and 250 gms $H_2O$. The solution was heated to 200°–210°C for 4 hours with rocking. The hydrolysis product was then brought to a pH of 8.0 by addition of $NH_4OH$ and the 8-hydroxyquinoline precipitated out. Upon filtration and drying, a relatively pure product of 19.7 gms (78.8%) was obtained. IR analysis confirmed the product was 8-hydroxyquinoline.

EXAMPLE 3

A 2.4 liter rocking autoclave was fitted with a glass liner and charged with 25 gms (0.174 moles) of 8-aminoquinoline, 140 gms (1.2 moles) of $NH_4HSO_4$ and 300 gms of $H_2O$. The solution was heated to 227°–235°C for 3 hours with rocking. The hydrolysis product was then brought to a pH of 8.0 by addition of $NH_4OH$ and the 8-hydroxyquinoline precipitated out. Upon filtration 21.7 gms (86.8%) was obtained. IR analysis confirmed the product was 8-hydroxyquinoline.

EXAMPLE 4

A 0.5 liter rocking autoclave was fitted with a glass liner and charged with 5 gms (0.035 moles) of 5-aminoquinoline, 11.9 gms of $H_3PO_4$ (0.11 moles) and 50 gms $H_2O$. The solution was heated for 6 hours at 180°–193°C with rocking. The hydrolysis product was then brought to a pH of 8.0 by addition of $NH_4OH$ and the 5-hydroxyquinoline precipitated out. Upon filtration, 4.4 gms (87%) was obtained. IR analysis confirmed the product was 5-hydroxyquinoline.

What is claimed is:

1. A process for preparing hydroxyquinoline comprising the steps of reacting aminoquinoline with an acid selected from hydrochloric acid, sulfuric acid and phosphoric acid in an aqueous medium and then isolating the resulting hydroxyquinoline wherein the molar ratio of acid to aminoquinoline is from about 1.5:1 to about 10:1 and wherein the reaction is run at a temperature of from about 160°C to about 220°C and at a pressure of from about 75 psi to about 325 psi.

2. A process for preparing hydroxyquinoline as in claim 1 wherein the reaction is run at a temperature of from about 190°C to about 210°C and at a pressure of from about 165 psi to about 265 psi.

3. A process as in claim 1 wherein the aminoquinoline is 5-aminoquinoline and the resulting product is 5-hydroxyquinoline.

4. A process as in claim 1 wherein the aminoquinoline is a mixture of 5-aminoquinoline and 8-aminoquinoline and the resulting product is a mixture of 5-hydroxyquinoline and 8-hydroxyquinoline.

5. A process as in claim 2 wherein the aminoquinoline is 5-aminoquinoline and the resulting product is 5-hydroxyquinoline.

6. A process as in claim 2 wherein the aminquinoline is a mixture of 5-aminoquinoline and 8-aminoquinoline and the resulting product is a mixture of 5-hydroxyquinoline and 8-hydroxyquinoline.

7. A process for preparing 8-hydroxyquinoline comprising the steps of reacting 8-aminoquinoline with an acid selected from hydrochloric acid, sulfuric acid and phosphoric acid in an aqueous medium and then isolating the resulting 8-hydroxyquinoline wherein the molar ratio of acid to 8-aminoquinoline is from about 1.5:1 to about 10:1 and wherein the reaction is run at a temperature of from about 160°C to about 220°C and at a pressure of from about 75 psi to about 325 psi.

8. A process as in claim 7 wherein the reaction is run at a temperature of from about 190°C to about 210°C and at a pressure of from about 165 psi to about 265 psi.

9. A process for preparing hydroxyquinoline comprising the steps of reacting aminoquinoline with an aqueous bisulfate in an aqueous medium and then isolating the resulting hydroxyquinoline wherein the molar ratio of bisulfate to aminoquinoline is from about 1.5:1 to about 10:1 and wherein the reaction is run at a temperature of from about 160° to about 220°C and at a pressure of from about 75 psi to about 325 psi.

10. A process for preparing 8-hydroxyquinoline comprising the steps of reacting 8-aminoquinoline with an aqueous bisulfate in an aqueous medium and then isolating the resulting 8-hydroxyquinoline wherein the molar ratio of bisulfate to 8-aminoquinoline is from about 1.5:1 to about 10:1 and wherein the reaction is run at a temperature of from about 160°C to about 220°C and at a pressure of from about 75 psi to about 325 psi.

* * * * *